United States Patent Office 3,152,181
Patented Oct. 6, 1964

3,152,181
ALKOXYPROPYLENE BIGUANIDES
Seymour L. Shapiro, Hastings on Hudson, and Louis Freedman, Bronxville, N.Y.; Florence M. Shapiro, executrix of Seymour L. Shapiro, deceased, and said Freedman assignors to U.S. Vitamin & Pharmaceutical Corporation, New York, N.Y., a corporation of Delaware
No Drawing. Filed Jan. 18, 1961, Ser. No. 83,360
17 Claims. (Cl. 260—564)

This invention relates to alkoxypropyl biguanides, to a process of preparing such biguanides, to antimicrobial compositions comprising such biguanides, and to a process of combatting microbes by use of such biguanides.

Davies, Francis, Martin, Rose and Swain, in the British Journal of Pharmacology 9, 192–6 (1954), reported a series of bis-biguanides that displayed a wide range of antibacterial action against gram-positive and gram-negative bacteria, but only a feeble action against spores. The best of these series of compounds was said to be Hibitane, which has the chemical configuration:

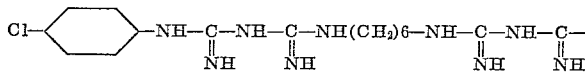—NH—C—NH—C—NH(CH$_2$)$_6$—NH—C—NH—C—NH——Cl
            ‖      ‖                              ‖      ‖
            NH    NH                             NH    NH Hibitane is now available commercially, not only in Great Britain where it originated, but also in the United States, under the name chlorhexidine. These and additional bis-biguanides wherein the chlorine on the phenyl group is replaced by other halogen or by alkyl, alkoxy or nitro groups, and the phenyl is attached directly or through an alkylene group to the biguanide nucleus, are described in U.S. Patents Nos. 2,684,924 to Rose and Swain, patented July 27, 1954, and 2,863,919 to Birtwell and Rose, patented December 9, 1958. The ethylene bis aryl biguanides are described in U.S. Patent No. 2,690,455 to Kaiser et al., dated September 28, 1954, and are not said to have germicidal properties.

Since that time a large number of reports have appeared in the literature, describing the activity and clinical properties of the bis-biguanide germicides. These reports are summarized by Lawrence in the J. Am. Pharm. Assn., 49, 731 (1960). However, he notes that the bis-biguanides have several disadvantages. Hibitane and analogous compounds are highly insoluble in water. The diacetate salt has a solubility in water of only approximately 1.9%, and the dihydrochloride has a solubility of only 0.06%. Moreover, Hibitane is reduced in antimicrobial activity by organic substances, such as milk, blood, pus, etc., as also are a number of other commonly used germicides, Calman and Murray, Brit. Med. J. 2:200 (1956).

Prior to the development of the bis-biguanides, it was known that certain mono-biguanides had weak germicidal properties. Puller reported in the Biochem. J. 41, 403–8 (1947) that phenylbiguanide was moderately bacteriostatic against streptococci, but only weakly so against staphylococci and gram-negative bacteria. Sirsi, Rao and De in Current Science (India) 19, 317–18 (1950) showed that N$^1$-p-chloro-phenyl-N$^5$-(8′-chloro-5′-quinolyl) biguanide acetate had a moderate bacteriostatic activity against *Staphylococcus aureus* (1:50,000), *Streptoccus pyogenes* (1:50,000), *Salmonella typhosa* (1:50,000), *S. paratyphi* (less than 1:50,000), *Shigella paradysenteriae* (less than 1:50,000), *Shigella dysenteriate* (less than 1:30,000) and *E. coli* (1:25,000). This germicidal activity is not such as to be of interest commercially; the bis-biguanides are in fact considerably more active than this.

Other biguanides are reported in U.S. Patents Nos. 2,455,896, and 2,455,897 to Nagy, dated December 7, 1948, and No. 2,467,371 to Curd and Rose, dated April 19, 1949, and British Patent No. 577,843 to Curd and Rose, but none is said to have germicidal activity. It will be noted that the Rose of Patents Nos. 2,467,371 and Br. 577,843, is the same Rose who was co-inventor of the bis-biguanide Patents Nos. 2,684,924 and 2,863,919, and who co-authored the article on Hibitane referred to above. Although these patents do not indicate that the biguanides they describe have any bactericidal or antimicrobial properties, they do have very broad disclosures of utility, and recite a variety of uses for the mono-biguanides, among them, utility as pharmaceuticals or chemotherapeutic agents, and as intermediates in the preparation of chemotherapeutic agents, textile agents, dyestuffs, insecticides, rubber chemicals, plastics, resins and the like.

Against this background, the development of the bis-biguanides is seen as a successful effort to increase the bactericidal activity of the mono-biguanides by doubling the number of biguanide units in the molecule. The patent literature does not show that the known substituent groups on the biguanide nucleus increase germicidal activity to any degree.

In accordance with the instant invention, it has been determined that monobiguanides having at least one alkoxypropyl group having from about eleven to about nineteen carbon atoms attached to the N$^1$ or N$^5$ terminal nitrogen atoms display exceptional antimicrobial activity. One alkoxypropyl group is sufficient, but if desired, additional alkoxypropyl groups can be attached to these nitrogen atoms, up to a total of four; preferably, only one alkoxypropyl group is present. Any remaining positions of these nitrogen atoms not so substituted are taken up by hydrogen or other organic radicals having from one to about eighteen carbon atoms.

By the term "alkoxypropyl" is meant any group of the form ROCH$_2$CH$_2$CH$_2$—, where R is a long chain normal alkyl group having from about eight to about sixteen carbon atoms, preferably from about ten to about fourteen carbon atoms, the alkoxypropyl group being linked to the biguanide nucleus through the propylene group —CH$_2$CH$_2$CH$_2$—.

The monobiguanides of this invention can be defined by the following formula:

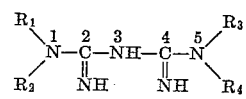

In the above formula, at least one of R$_1$, R$_2$, R$_3$ and R$_4$, up to a total of four, is an alkoxypropyl group. Any remaining R's are hydrogen or organic radicals having from one to about eighteen carbon atoms. Typical organic radicals include alkyl, alkoxyalkyl, alkenyl, cycloalkyl, aryl, heterocyclic, alkaryl, aralkyl, haloalkyl and haloaryl groups. Preferably, the organic radical has from one to about twelve carbon atoms.

3

For optimum antimicrobial action, $R_1$ of the above formula is an alkoxypropyl group, $R_2$ is hydrogen, $R_3$ is selected from the group consisting of hydrogen, alkyl, alkenyl, cycloalkyl, aralkyl, haloaralkyl, aryl and haloaryl groups, and $R_4$ is selected from the group consisting of hydrogen, alkyl and aralkyl groups.

The halogen of the haloaralkyl and haloaryl groups can be any of the halogen atoms, such as, for example, fluorine, chlorine, bromine or iodine. Chlorine is preferred.

Exemplary alkyl radicals include methyl, ethyl, n-propyl, isopropyl, n-butyl, isobutyl, secondary butyl, amyl, isoamyl, hexyl, isohexyl, and secondary hexyl; exemplary alkenyl radicals include allyl and crotyl. Preferably, the alkyl and alkenyl radicals have from one to three carbon atoms.

Typical aryl, alkoxyaryl, and alkaryl radicals include phenyl, diphenyl, naphthyl, furyl, thienyl, tetramethylphenyl, xylyl, methylphenyl; ethoxyphenyl, dimethoxyphenyl, methoxyphenyl, diethoxyphenyl, tetramethoxyphenyl, ethylphenyl, and isohexylphenyl. Exemplary aralkyl radicals include benzyl, p-methyl benzyl, α-phenylethyl, β-phenethyl, α-methyl-β-phenethyl, α-phenyl-β-phenethyl, β-phenyl-β-phenethyl, benzhydryl, and 1-indanyl. Typical cycloalkyl radicals include cyclopentyl methyl cyclopentyl, cyclohexyl, methyl cyclohexyl, ethyl cyclohexyl, and ethyl cyclopentyl.

Preferably the aryl, alkoxyaryl, alkaryl, aralkyl, and cycloalkyl radicals have from five to eight carbon atoms.

$R_1$ and $R_2$ or $R_3$ and $R_4$ when taken together as a single bivalent radical, each valvence of which is connected to the nitrogen atom, form heterocyclic rings with the $N^1$ or $N^5$ nitrogen atom, such as isoindolino and tetrahydroisoquinolino.

Typical haloaralkyl radicals include 4-chlorobenzyl, 4-bromobenzyl, 4-fluorobenzyl, 4-iodobenzyl, 4-bromo-α-phenylethyl, 3-chloro-α-phenylethyl, 2-chloro-β-phenethyl, 2-bromobenzyl, 3,4-dichlorobenzyl, 2,4-dichlorobenzyl, 3,4,5-trichlorobenzyl, 2,4,5-trichlorobenzyl, 2,5-dichlorobenzyl, 2,3-dichlorobenzyl, 2,3-dibromobenzyl, 2,4-diiodobenzyl, 4-iodo-α-phenylethyl, 2-chloro-5-bromobenzyl, 2,4-dibromobenzyl, 2,4,6-tribromobenzyl, 2,4,5-trichloro-α-phenylethyl, 4-chloro-α-phenylpropyl, 3,4-diiodobenzyl, 3,4-dichloro-β-phenylpropyl, 4-chloro-γ-phenylbutyl, α-(p-chlorophenyl)-phenethyl, p-chlorobenzhydryl, β-(m-bromophenyl)-phenethyl, 2,4-dichloro-α-phenylbutyl, and 3,4-diiodo-α-phenylbutyl. The haloaralkyl radical can have from one to three halogen atoms.

Typical haloaryl radicals include o-, m- and p-chlorophenyl, o-, m- and p-iodophenyl, 2,4-dichlorophenyl, 2,5-difluorophenyl, 3,4-dibromophenyl, 3,4-dichlorophenyl, 2-chloro-α-naphthyl, 1-chloro-β-naphthyl, and 2,4,5-trichlorophenyl.

The following biguanides are exemplary of the invention. In the formulae

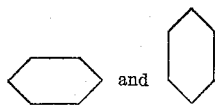 and 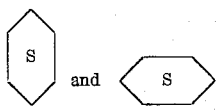

represent an aromatic carbocyclic ring, and

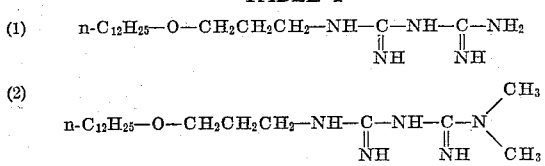

represent a saturated carbocyclic ring:

TABLE I

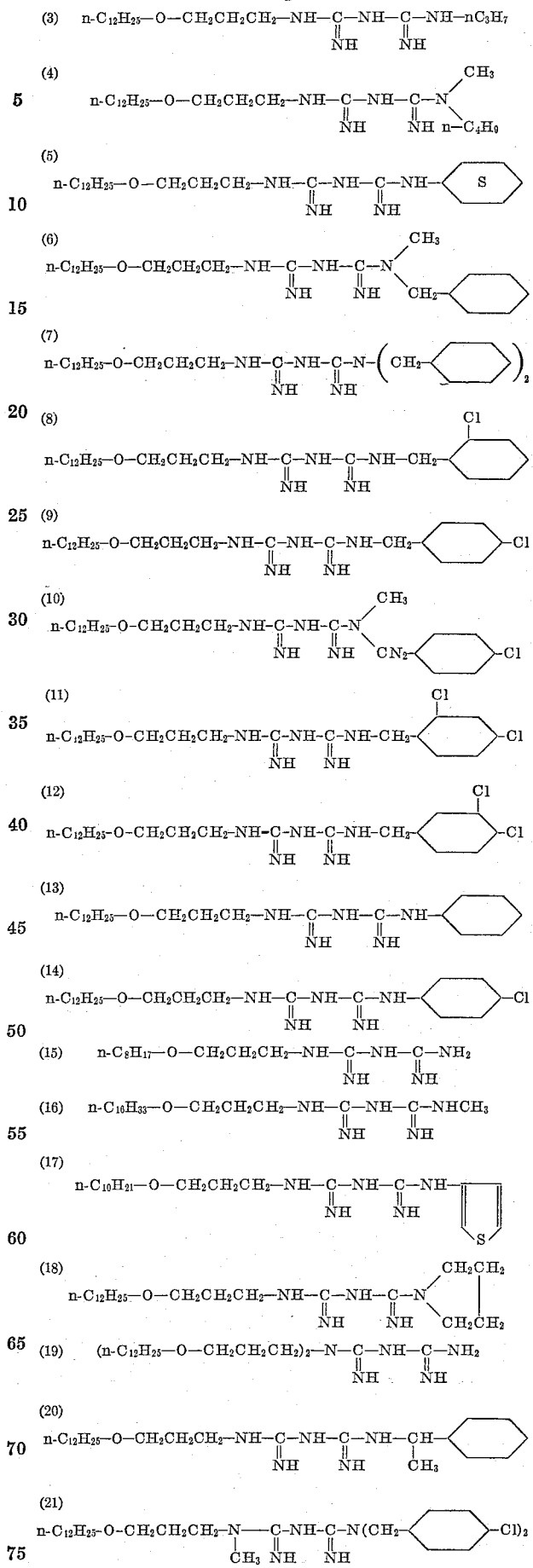

TABLE I—Continued
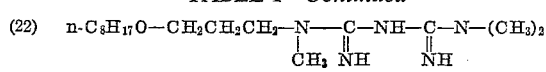
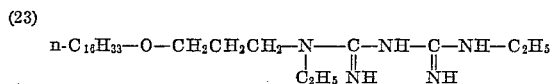
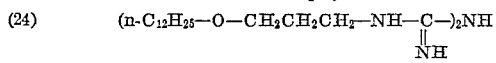
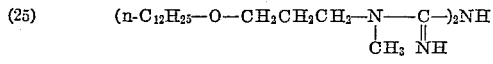
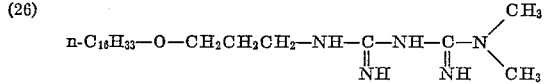
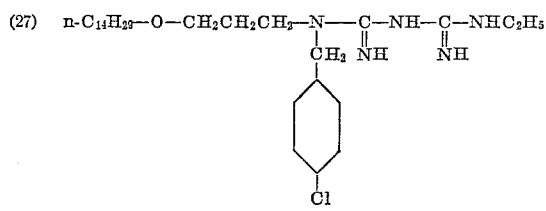
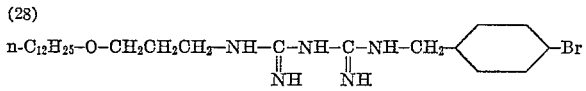
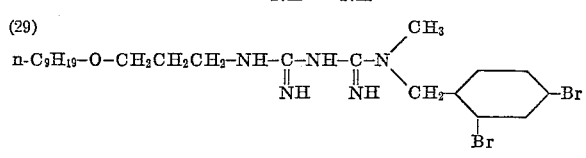
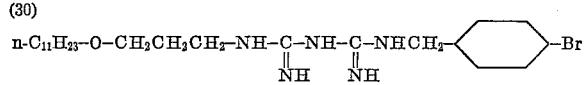
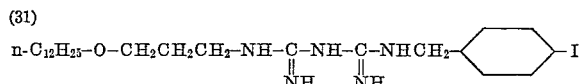
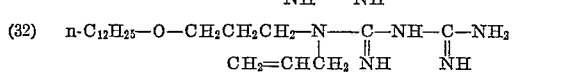
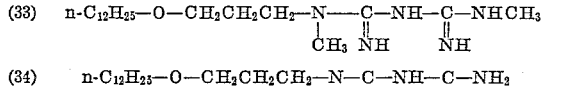
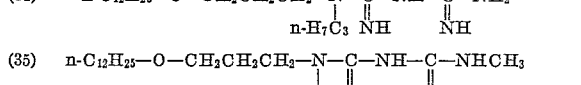
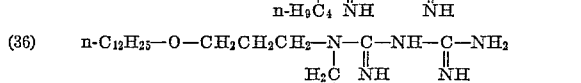
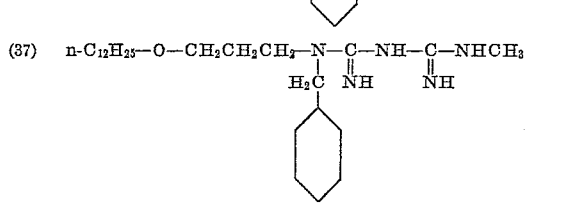
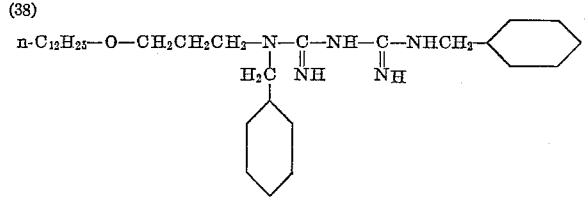
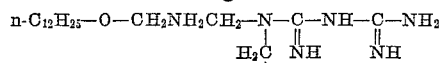
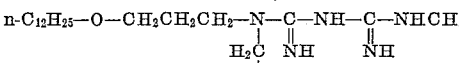
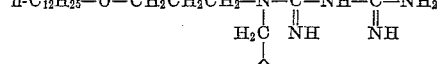
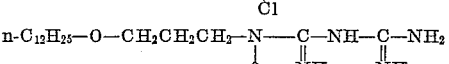
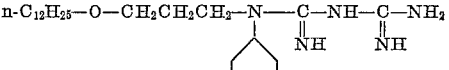
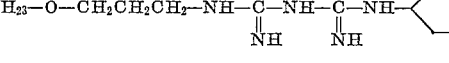
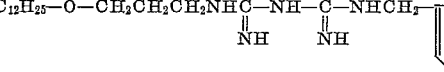
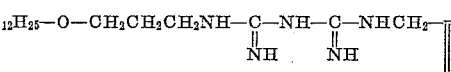
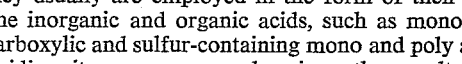
The biguanides of the invention can be used as the free base, but where water-solubility is a factor in their use, they usually are employed in the form of their salts with the inorganic and organic acids, such as mono and poly carboxylic and sulfur-containing mono and poly acids and acidic nitrogen compounds, since these salts are more soluble.

Such salts which are formed from the corresponding acid (indicated by HX in the formula below) include the hydrochloride, hydrobromide, sulfate, phosphate, borate, phosphite, sulfite, sulfonate, nitrite, carbonate, nitrate, acetate, tartrate, propionate, oxalate, maleate, malate, picrate, and β-ethoxypropionate, and the salts with acidic nitrogen compounds such as theophylline, substituted theophyllines and similar purines, saccharin, phthalimide, benzoxazine-2, 4-diones, oxazolidine-2,4-dione and substituted oxazolidone-2,4-diones, N-p-methylbenzenesulfonyl-N'-n-butylurea, barbituric acids, and mercaptobenzothiazole, 8-chlorotheophylline and succinimide.

The compounds of this invention are conveniently prepared by reaction of equimolar quantities of the appropriately substituted dicyandiamide with an acid salt (preferably the hydrochloride) of the appropriately substituted amine, as illustrated by the following equations:

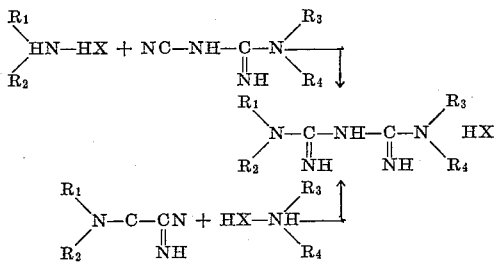

The alkoxypropyl amines are conveniently prepared by condensation of the long chain ROH with acrylonitrile (Org. Reactions, vol. V, John Wiley & Sons, Inc., chapter on Cyanoethylation) to give the w-alkoxypropylamines, which in turn was reduced to the w-alkoxypropulamines (Shapiro et al., J. Am. Chem. Soc. 81:3083 (1959)).

The required dicyandiamides for use in the reaction can be prepared following the procedure described by Shapiro et al., J. Am. Chem. Soc. 81, 4635 (1959). This procedure is illustrated in the working examples which are given below.

*Examples A to E.—Lauroxypropylenedicyandiamide*

To a suspension of 14.2 g. (0.16 mole) of sodium dicyanamide in 200 ml. of n-butanol, there was added 38.94 g. of lauroxypropylamine followed by 13.3 ml. (0.16 mole) of 12-N-hydrochloric acid, under cooling. The reaction mixture was heated under reflux for six hours, with stirring, and the sodium chloride which formed separated. The filtrate on concentration and evaporation of the butanol yielded a white solid 44.5 g., which was recrystallized from acetonitrile. The yield was 28.9 g. (64%) of product, M.P. 43–45° C.

*Analysis.*—Calc. for $C_{17}H_{34}N_4O$: C, 65.8; H, 11.0; N, 18.1. Found: C, 65.8; H, 10.9; N, 18.1.

In a similar manner the following substituted dicyandiamides were prepared: (B) 2-chlorobenzyl, M.P. 180–183° C.; (C) 4-chlorobenzyl, M.P. 155–156° C.; (D) 2, 4-dichlorobenzyl, M.P. 198–202° C.; (E) 3,4-dichlorobenzyl, M.P. 174° C.

The reaction of the substituted dicyandiamide and the amine salt can be conducted in the absence of a dispersant, but it is frequently advantageous to use an inert dispersant medium which can be a solvent such as water or a non-solvent such as xylene or chlorobenzene. Whether a dispersant is used or not, the reaction mixture is heated at an elevated temperature, preferably from about 70 to about 200° C., for a period of from 0.2 to 2 hours. The higher the temperature, the shorter the reaction time. When a dispersant is used, the reaction temperature conveniently is the reflux temperature of the mixture. When no dispersant is used, the reactants can be heated to their fusion temperature. After a reaction period appropriate for the reaction temperature selected, the product is recovered by recrystallization.

If the amine salt is used as a starting material, the salt obtained of the biguanide is normally in pure form. It is possible to obtain the biguanide free base by adding one equivalent of alkali to the product in water or alcohol. The free base, in turn can be isolated and purified or, upon reaction with one equivalent of a desired acid, converted to the salt of that acid, which, in turn, can be purified.

Additionally, the more soluble salts such as the hydrochloride salts can be converted to more sparingly soluble salts, as, for example, the nitrate, by treating an aqueous solution of the hydrochloride with an excess of a salt of an alkali metal and the corresponding anion, such as sodium nitrate.

The following examples, in the opinion of the inventors, represent preferred embodiments of biguanides of the invention:

*Example 1.—$N^1$-Lauroxypropyl Biguanide Nitrate (Compound No. 1)*

An intimately ground mixture of 12.0 g. (0.043 mole) of lauroxypropylamine hydrochloride and 3.6 g. (0.043 mole) of dicyandiamide was heated over one hour as the temperature was raised from 100 to 180° C. The reaction product was cooled, and dissolved in 120 ml. of water, and treated with 10 g. of sodium nitrate. The product (15.2 g. (96%)) was recrystallized from acetonitrile to give 5.03 g. (30%) of product, M.P. 92–94° C.

*Analysis.*—Calc. for $C_{17}H_{38}N_6O_4$: C, 52.3; H, 9.8. Found: C, 52.6; H, 9.4.

The product was also identified as its dipicrate, M.P. 127–128° C.

*Analysis.*—Calc. for $C_{29}H_{43}N_{11}O_{15}$: N, 19.6. Found: N, 20.1.

*Example 2.—$N^1$-Lauroxypropyl-$N^5,N^5$-Dimethyl Biguanide Hydrochloride (Compound No. 2)*

An intimately ground mixture of 0.8 g. (0.01 mole) of dimethyl amine hydrochloride and 3.1 g. (0.01 mole) of lauroxypropyldicyandiamide was heated over one hour as the internal temperature was raised from 119 to 169° C. The solid obtained was cooled and recrystallized from 50 ml. of acetonitrile to give 1.91 g. (48.5%) of product, M.P. 100–108° C.

*Analysis.*—Calc. for $C_{19}H_{42}ClN_5O$: N, 17.9. Found: N, 17.6.

*Example 3.—$N^1$-Lauroxypropyl-$N^5$-Benzyl-$N^5$-Methyl Biguanide Hydrochloride (Compound No. 6)*

An intimately ground mixture of 2.8 g. (0.01 mole) of lauroxypropylamine hydrochloride and 1.9 g. (0.01 mole) of N-methyl benzyldicyandiamide was heated over a period of 50 minutes as the internal temperature was raised from 70 to 157° C. The product was cooled and recrystallized from 50 ml. of acetonitrile. The yield was 3.6 g. (76.5%) of product, M.P. 85–90° C.

*Analysis.*—Calc. for $C_{25}H_{46}ClN_5O$: C, 64.1; H, 9.9. Found: C, 64.3; H, 9.9.

*Example 4.—$N^1$-Lauroxypropyl-$N^5,N^5$-Dibenzyl Biguanide Hydrochloride (Compound No. 7)*

An intimately ground mixture of 2.3 g. (0.01 mole) of dibenzylamine hydrochloride and 3.1 g. (0.01 mole) of lauroxypropyldicyandiamide was heated over 1.25 hours as the internal temperature was raised from 121 to 181° C. The cooled product was recrystallized from 50 ml. of acetonitrile. The yield was 3.38 g. (62%) of product, M.P. 110–120° C.

*Analysis.*—Calc. for $C_{31}H_{50}ClN_5O$: C, 68.4; H, 9.3; N, 12.9. Found: C, 68.2; H, 9.0; N, 12.8.

*Example 5.—$N^1$-Lauroxypropyl-$N^5$-(4-Chlorobenzyl)-Biguanide Hydrochloride (Compound No. 9)*

An intimately ground mixture of 2.8 g. (0.01 mole) of lauroxypropylamine hydrochloride and 2.1 g. (0.01 mole) of (4-chlorobenzyl)-dicyandiamide was heated over a period of 1.1 hours as the internal temperature was raised from 85 to 160° C. The product was cooled and recrystallized from 65 ml. of acetonitrile. The yield was 3 g. (61%), of product, M.P. 94–97° C.

*Analysis.*—Calc. for $C_{24}H_{43}Cl_2N_5O$: C, 59.0; H, 8.9; N, 14.3. Found: C, 59.6; H, 9.4; N, 14.1.

*Example 6.—$N^1$-Lauroxypropyl-$N^5$-(4-Chlorobenzyl)-$N^5$-Methylbiguanide Hydrochloride (Compound No. 10)*

An intimately ground mixture of 1.9 g. (0.01 mole) of N-methyl-p-chlorobenzylamine hydrochloride and 3.1 g. (0.01 mole) of lauroxypropyldicyandiamide was heated over 1.25 hours as the internal temperature was raised from 124 to 175° C. The product was cooled and recrystallized from 150 ml. of acetonitrile. The yield was 2.61 g. (51%) M.P. 150–155° C.

*Analysis.*—Calc. for $C_{25}H_{45}Cl_2N_5O$: N, 13.9. Found: N, 13.5.

*Example 7.—$N^1$-Lauroxypropyl-$N^5$-(2,4-Dichlorobenzyl)-Biguanide Hydrochloride (Compound No. 11)*

An intimately ground mixture of 2.8 g. (0.01 mole) of lauroxypropylamine hydrochloride and 2.4 g. (0.01 mole) of (2,4-dichlorobenzyl)-dicyandiamide was heated over 1.4 hours as the internal temperature was raised from 79 to 171° C. The product was cooled and recrystallized from 125 ml. of acetonitrile. The yield was 4.1 g. (79%) of product, M.P. 73–76° C.

*Analysis.*—Calc. for $C_{24}H_{42}Cl_3N_5O$: N, 13.4. Found: N, 12.8

*Example 8.—$N^1$-Lauroxypropyl-$N^5$-(3,4-Dichlorobenzyl)-Biguanide Nitrate (Compound No. 12)*

An intimately ground mixture of 2.8 g. (0.01 mole) of lauroxypropylamine hydrochloride and 2.4 g. (0.01 mole) of (3,4-dichlorobenzyl)-dicyandiamide was heated over 1.4 hours as the internal temperature was gradually raised from 86 to 170° C. The cooled product was dissolved in 150 ml. of water, filtered and the filtrate treated with 10 ml. of saturated sodium nitrate solution. The precipitate which formed was separated, and dried. After recrystallization from 50 ml. of acetonitrile, the yield of product was 2.48 g. (45%), M.P. 99–100° C.

*Analysis.*—Calc. for $C_{24}H_{42}Cl_2N_6O_4$: C, 52.5; H, 7.7. Found: C, 52.3; H, 7.6.

Using the above procedure, any of the compounds listed in the table in columns 3 to 6, inclusive, can be prepared.

The biguanides of this invention are extremely potent bacteriostatic, bactericidal, and fungistatic agents when brought into contact with the microbes by any desired means, and have been found to be effective against the important gram-positive bacteria and fungi at levels consistant with the highest activity demonstrated in in vitro tests with the most effective known antibiotics. This acivity is paricularly remarkable in that under conditions of repeated transfer, no bacterial resistance is obtained even after as many as 25 transfers.

Data on the bactericidal and fungicidal and antimonoilial activity of a number of compounds within the invention is given in Tables II and III. These data attest to the effectiveness of these biguanides. The following test conditions were employed in obtaining these data.

Bacteriostatic activity was established by spreading 100,000 bacterial cells on the surface of a petri plate containing nutrient agar in which had been incorporated the particular concentration of biguanide. A plate containing 1.0 microgram of the biguanide per ml. of agar (1 part per million) for example, has 15 micrograms of the biguanide added to a 15 ml. portion of melted nutrient agar, mixed thoroughly, and the agar poured into the plate. After incubation at 37° C. for 2 days, the plates were examined for visible colony growth. The minimum inhibitory concentration (M.I.C.) is the lowest concentration of biguanide expressed in parts per million that prevented completely the appearance of visible growth in this test.

Fungistatic activity was assessed following the usual procedures employed by those skilled in this art.

Bactericidal activity was determined by exposing a given concentration of cells such as $10^9$ (other concentrations give nearly identical results) to a given concentration of biguanide in nutrient broth (or other media such as saline) for a period of 5 minutes (longer times give identical results; shorter times require slightly more biguanide) at a temperature of 37° C. (other temperatures give identical results). The number of bacteria that remained alive was determined by diluting the sample and spreading appropriate dilutions on plain nutrient agar plates. The dilution dilutes the biguanide to levels far below the bacteriostatic level, and dilutes the bacterial sample so that isolated colonies can be obtained and counted. Control plates and tubes were included to make certain that the bacteria were not dying in the absence of the exposure to the biguanides and because of the experimental manipulations. The lowest concentration of biguanide in parts per million which prevented the appearance of visible growth is the M.I.C.

The antibiotic resistant strains of *Staphylococcus aureus* were shown to be resistant to the antibiotic, and responsive to the antimicrobial action of the biguanide, by the same type of petri plate test used for the bacteriostatic evaluation of the biguanides.

The results of the testing are shown in the tables. In many instances the specific end point consistent with complete antimicrobial action was not obtained, but the ranges shown are illustrative of the order of activity. Much lower concentrations in many instances would be required to partially inhibit the bacterial growth. The minimum inhibitory concentration, reflecting the test conditions employed, is by far the most severe criteria for evaluating compounds in that it defines the complete destruction of every organism under the test condition.

It will be noted that the bacteriostatic range reflects a far higher degree of sensitivity of response for certain of the organisms as compared to others. It is apparent from the above data that the compounds of the invention are particularly striking in their capacity to destroy *Aspergillus niger* and *Staphylococcus aureus*, which incidentally does not acquire resistance to these compounds.

TABLE II

| Biguanide Nitrate | Minimum Inhibitory Concentration (p.p.m.) | | | |
| --- | --- | --- | --- | --- |
| | S. aureus | Aspergillus niger | Penicillium | Monilia albicans |
| $N^1$-lauroxypropyl | 0.3–1 | 5 (99% at 1) | 0.3–1 | 33 (partial). |
| $N^1$-lauroxypropyl $N^5,N^5$-dimethyl | 0.1–0.3 | | 0.3–1 | 33. |
| A. $N^1$-methoxypropyl | None at 100 | | | |
| B. $N^1$-phenoxyethyl | do | | | |
| C. $N^1$-methyl $N^1$-phenoxyethyl | do | | | |
| D. 2-phenoxypropyl | do | | | |
| E. $N^1$-methyl-$N^1$-2-phenoxypropyl | do | | | |

TABLE III

| Biguanide Hydrochloride | Minimum Inhibitory Concentration (p.p.m.), S. aureus |
|---|---|
| N¹-lauroxypropyl- N⁵-methyl-N⁵-benzyl | 0.3-1 |
| N¹-lauroxypropyl- N⁵,N⁵-dibenzyl | 1-3 |
| N¹-lauroxypropyl- N⁵-2-chlorobenzyl | 1-3 |
| N¹-lauroxypropyl- N⁵-4-chlorobenzyl | 0.3-1 |
| N¹-lauroxypropyl- N⁵-methyl-N⁵-4-chlorobenzyl | 0.3-1 |
| N¹-lauroxypropyl- N⁵-2,4-dichlorobenzyl | 1-3 |

It is known that with continued use of antibiotics, many resistant bacterial strains have emerged. Certain strains of *Staphylococcus aureus* are at present a serious hazard, and there is a great need for suitable hygienic and therapeutic means to destroy such organisms. The compounds of this invention are effective against antibiotic-resistant *S. aureus*, and *S. aureus* are apparently unable to acquire resistance to the antimicrobial action of these biguanides.

Many antimicrobial substances are temperature-sensitive in conjunction with their antimicrobial activity, but the compounds of the invention are equally effective at temperatures extending from 2° to 45° C. at any pH in the range of from 5 to 10.

Additionally, the compounds of this invention are equally effective in their activity when the organism is in an aqueous medium, bacteriological nutrient medium or in serum. In the latter respect, these compounds differ significantly from the bis-biguanides, whose activity is reduced in serum.

The biguanide compounds of the invention can be employed in conjunction with other medicaments for specific purposes, according to the therapeutic effects required. Other medicaments which can be employed, in the form of compositions in which they are compatible with the biguanides, include the antihistamines; sulfa drugs, for example, sulfadiazine, sulfabenzamide, sulfacetamide, sulfanilamide, sulfapyridine, sulfathiazole, sulfapyrazine, sulfaguanidine, sulfaphthalidine, sulfasuxidine, sulfisoxazole, sulfamylon, phthalylsulfacetamide, N'-3,4-dimethylbenzoylsulfanilamide, benzylsulfanilamide and N'-2-(2-quinoxalyl) sulfanilamide; lipotropic agents, such as methionine, choline, isositol and beta-sitosterol and mixtures thereof; stimulants of the central nervous system, for instance, caffeine and the amphetamines; local anesthetics; analgesics, such as aspirin, salicylamide, sodium gentisate, p-acetylaminophenol, phenacetin and codeine; laxatives, such as phenolphthalein; sedatives, for example, barbiturates and bromides; salts of penicillin, such as potassium penicillin G, procaine, penicillin G, 1-ephenemine penicillin G, dibenzylamine pencillin G, and other penicillin salts disclosed in U.S. Patent 2,627,491; phenoxymethylpenicillin and salts thereof; additional antibiotic agents, such as streptomycin, dihydrostreptomycin, bacitracin, polymixin, tyrothricin, erythromycin, chlortetracycline, oxytetracycline, tetracycline, oleandomycin, chloramphenicol, magnamycin, novobiocin, cycloserine and meomycin; vitamins, for instance, vitamins A, $A_1$, $B_1$, $B_2$, $B_6$, $B_{12}$, and members of that family, folic acid and members of that family, and vitamins C, $D_2$, $D_3$ and E; hormones, such as cortisone, hydrocortisone, 9-α-fluorocortisone, 9-α-fluorohydrocortisone, prednisone and prednisolone; anabolic agents, such as 11,17 - dihydroxy-9-α-fluoro-17-α-methyl-4-androsten-3-one and 17-α-ethyl-19-nortestosterone; and additional antifungal agents such as Mycostatin.

The biguanides of the invention are suitable for oral administration as antibiotics, antibacterial and antifungal agents. For this purpose, the biguanides suitably are compounded with an excipient which is non-toxic, edible or potable, and chemically inert to the substituted biguanide salt. The proportion of the excipient should be at least sufficient to separate the particles of the biguanide from each other, and to cause quick solution or dispersion of the biguanide composition when contacted with the gastric juice of the stomach. When the excipient is a solid, the amount thereof may be form about 0.3 to about 5 parts for one part of the biguanide.

As solid excipients, lactose, sucrose, starch, pregelatinized starch, gum arabic, gum tragacanth and mixtures of these can be used. Suitably, the solid excipient may contain also admixed magnesium stearate, talc, cornstarch, or two or more of the additives to promote separation of the composition from the plunger and mold used in shaping the composition into tablets for use orally.

BIGUANIDE TABLET

| | Weight in Mgs. | Approximate Percentage |
|---|---|---|
| Biguanide No. 2 | 100.0 | 62.0 |
| Sucrose | 25.9 | 16.0 |
| Starch | 22.1 | 13.5 |
| Acacia | 7.8 | 4.5 |
| Talc | 3.1 | 2.0 |
| Magnesium Stearate | 1.5 | 1.0 |
| Stearic Acid | 1.6 | 1.0 |

The biguanide of the above composition can be replaced by any of the other biguanides described and claimed herein, on an equal weight basis. The biguanides may be employed alone and in compatible admixtures when preparing various formulations.

In making the tablet, the biguanide is mixed with the sucrose and gum acacia, and then with starch made previously into a paste with a small amount of distilled water. This mixture is dried at low heat, and put through a granulator which converts it into a granular powder. This mix is then blended with the talc, magnesium stearate and the stearic acid which act as mold lubricants. The whole is now mixed in a pony mixer or other suitable powder mixing equipment, and then is ready for tabletting on any type of tabletting machine or for filling into hard gelatin capsules.

The biguanides can also be compounded in the form of solutions and elixirs which suitable solvents and dispersants, such as are conventionally used in such formulations. Aqueous and alcoholic solutions usually are used, as is evident from the examples of cosmetic lotions and solutions which are given later.

The amount of biguanide is not critical, and is chosen to meet the need; usually, from 0.02 to about 15% is adequate.

These biguanides are effective anti-bacterial agents for use in the preparation of germicidal soaps, in which environment they are not inactivated by the soap, as are many other germicidal agents such as the alkyl phenols. Only small amounts of the biguanides are required to render soap germicidal. An amount as low as 0.01% based on the weight of the soap produces a soap composition having excellent antibacterial potency, and in addition such a soap furnishes antifungal and antibiotic action. As much as 5% has been used to advantage. There is no need to employ more than is required to give the desired effect, and in general from 0.2 to 2% is effective for most purposes and is preferred.

The biguanide soaps in accordance with the invention can be found as bar soaps, powered soaps, chip soaps, flake soaps, bead soaps, bar and cake soaps and soap compositions intended for toilet, washing and disinfectant purposes, in addition to their use as detergents. The compositions can be dried in any desired way; spray drying is convenient in many instances. It is desirable to hold the temperature to which the mix is subjected during conversion into its final form below the temperature at which the biguanide would be decomposed. Soap mixtures in accordance with the invention have been subjected to temperatures up to 125° F. for periods of up to one hour without disadvantage.

In particular, the soap compositions are desirably formulated to be at the pH range of from 7.0 to 7.5.

Those skilled in the art will perceive many variations in such soap compositions. For example, the biguanide need not be the only germicidal agent; other germicides, such as 2,2'-dihydroxy halogenated diphenylmethanes, can be included, for example, if desired.

The soap compositions, in addition to the soap and germicide, will also usually contain fillers, coloring materials and perfumes, as desired, as is familiar to those skilled in the detergent art.

The compositions containing the biguanide may contain mixtures of detergents, such as soap and an anionic nonsoap, or soap and a cationic nonsoap, or soap and a nonionic nonsoap, or be composed wholly of nonsoaps, including the anionic, cationic, and nonionic synthetic detergents. Typical satisfactory anionic nonsoaps are the alkyl sulfates, such as sodium lauryl sulfate, known in the trade as Duponol C; the alkyl aryl sulfonates, such as sodium polypropylene benzene or toluene sulfonates and the sodium keryl benzene or toluene sulfonates; the sulfated ethoxynated phenols, such as the ammonium salt of sulfated ethoxynated nonyl phenol, prepared by condensation of nonyl phenol with five moles of ethyleneoxide; the sodium fatty acid esters of taurine, such as sodium palmitic or oleic methyl tauride or mixtures thereof; the esters of higher fatty acids and hydroxy ethane sulfonates, such as oleic acid ester of hydroxy ethane sodium sulfonate. Also useful are nonionic nonsoaps, such as the polyethylene glycol esters of the higher fatty acids, for example, polyoxyethylene ethylene and propylene glycol stearates; the polyethylene glycol ethers of alkyl phenols, such as by the condensation product of octyl and nonyl phenol with five to twelve moles of ethylene oxide; the higher fatty acid esters of sorbitan-ethylene oxide condensates, such as sorbitan monosterate ester of polyoxyethylene glycol. They may be in any of the forms described heretofore, including cakes or powders, and may include various fillers, sudsing agents and ingredients conventionally employed in detergent formulations. They may be compounded for various purposes, such as for shampoo, dishwashing, textile laundering, toilet soaps and similar preparations. The biguanide may be included in compositions which contain soap or other surface active agents not intended primarily for detergent use, such as various powdered cosmetics.

The term "soap" as used herein refers to alkali metal soaps of the saturated and unsaturated higher fatty acids having from about eight to about twenty-six carbon atoms, such as capric, caprylic, lauric, myristic, palmitic, stearic, oleic, linoleic, linolenic, arachidic, behenic, margaric, tridechoic, and cerotic acids and the mixtures of such acids naturally occurring in fats, oils, waxes, and rosins, such as the soaps of coconut oil fatty acids, pig fat, fish oil fatty acids, beeswax, palm oil fatty acids, sesame oil fatty acids, peanut oil fatty acids, olive oil fatty acids, palm kernel oil fatty acids, cottonseed oil fatty acids, soybean oil fatty acids, corn oil fatty acids, babassu oil fatty acids, rosin acids, abietic acid, and greases.

The biguanide compounds of the invention are also useful in cosmetic and toilet preparations of all kinds, including, for example, cleansing creams and lotions, emollient creams and lotions, hand creams and lotions, hormone creams, suntan preparations, skin lighteners and bleaching creams, face powders, rouge, foundation makeups, lipsticks, eye makeups, dentifrices, mouth washes, shampoos, shaving soaps and creams, pre-shave and after-shave preparations, depilatories, bleaches, hair colorings and dye removers, wave sets, lacquers, rinses, and conditioners, hair preparations, eye lotions, nail lacquers, antiperspirants and deodorants, aerosol cosmetics, baby toiletries and hypoallergenic cosmetics.

All such preparations are of conventional formulation, employing a suspending or dispersing agent, a cosmetic base and other ingredients typical of the cosmetic use desired. The biguanide is incorporated in these compositions, with the aid of additional dispersing or suspending agents, where required, to make a uniform composition in which the biguanide remains homogeneously distributed or dispersed.

Cleansing creams can be of the usual white, emulsified or cold cream type, frequently referred to as the beeswax-borax type cream, or of the translucent liquefying type, consisting of a mixture of hydrocarbon oils and waxes. The minimum basic ingredients required for a beeswax-borax emulsion type of cream are beeswax, mineral oil, borax and water. Spermaceti, cetyl alcohol, cocoa butter and vegetable oils can be incorporated as emollients. The translucent liquefying type of cream will include a physical mixture of mineral oil, paraffin, petrolatum and other waxes. Emollient ingredients can also be incorporated in this type of cream. The following are typical formulations for the beeswax-borax and liquefying cleansing creams contemplated by the invention:

|  | Beeswax-Borax, Percent | Liquefying-Cleansing, Percent |
| --- | --- | --- |
| Beeswax | 8 |  |
| Mineral Oil |  | 64.5 |
| Paraffin | 7 | 20 |
| Cetyl alcohol | 1 |  |
| Borax | 0.4 |  |
| Water | 34.1 |  |
| Petrolatum | 15 | 15 |
| Biguanide No. 6 | 0.5 | 0.5 |

The following is a further example of a cleansing cream:

|  | Percent |
| --- | --- |
| Beeswax | 9 |
| Paraffin | 10 |
| Mineral oil, 65/75 | 30 |
| Cetyl alcohol | 1 |
| Deltyl Extra | 10 |
| Biguanide No. 2 | 0.5 |
| Borax | 1 |
| Water | 37.5 |
| Perfume | 0.5 |

The following are examples of anti-bacterial emollient creams:

|  | Emollient Creams, Percent | |
| --- | --- | --- |
| Part A: |  |  |
| Beeswax | 3.0 | 5.0 |
| Petrolatum |  | 10.0 |
| Spermaceti | 3.0 |  |
| Light Mineral Oil | 30.0 | 10.0 |
| Glyceryl monostearate, pure | 12.0 | 10.0 |
| Lanolin |  | 25.0 |
| Propyl paraben | 0.15 | 0.15 |
| Biguanide No. 2 | 2.0 | 2.0 |
| Part B: |  |  |
| Methyl paraben |  | 0.15 |
| Water |  | 37.4 |
| Perfume |  | 0.3 |

The above formulations will serve as lotion emulsions upon dilution with more of the solvent base, water in the case of an oil-in-water lotion, and oily components in the case of a water-in-oil emulsion.

The conventional hand cream formulation is a modified vanishing cream of the oil-in-water type, the basic composition being a stearic acid soap such as potassium stearate as the emulsifier, an excess of stearic acid, a humectant such as glycerol, and a high proportion of water. A hand lotion has a small proportion of solids, but is similar in formulation. Additional ingredients include barrier agents, emulsifiers, preservatives, perfume oils and coloring agents. The following are typical hand cream and lotion formulations:

| | Anionic Stearate type, Percent | Nonionic type, Percent | Cationic-nonionic type, Percent |
|---|---|---|---|
| Part A: | | | |
| Cetyl alcohol | 2 | | |
| Glyceryl monostearate | | | 1 |
| Isopropyl palmitate | | 3 | 3 |
| Lanolin | 1 | | 1 |
| Mineral oil | 2 | | |
| Polyethylene glycol 1,000 monostearate | | 5 | |
| Stearic acid | 13.0 | 20.0 | |
| Part B: | | | |
| Glycerol | 12 | | 5 |
| Methyl paraben | 0.15 | 0.15 | 0.1 |
| Polyethylene glycol 300 monostearate | | 5 | |
| Potassium hydroxide | 1 | | |
| Sorbo (70% aqueous sorbitol) | | 3 | |
| Stearyl colamino formyl methyl pyridinium chloride | | | 1.5 |
| Water | 68.35 | 63.35 | 87.9 |
| Part C: | | | |
| Perfume and color | q.s. | q.s. | q.s. |
| Biguanide No. 7 | 0.5 | 0.5 | 0.5 |

Suntan preparations contain an active sunscreen as the principal active ingredient, and in addition can have any desired cosmetic base. Suntan preparations can be in the form of oils, jellies, creams, lotions and ointments.

The following are typical lotion and cream preparations:

SUNTAN LOTION (ALCOHOLIC)

| | Percent |
|---|---|
| Glyceryl p-aminobenzoate | 3 |
| Propyleneglycol ricinoleate | 10 |
| Glycerol | 10 |
| Alcohol | 64.5 |
| Water | 12 |
| Perfume and color | Q.s. |
| Biguanide No. 9 | 0.5 |

SUNTAN CREAM (NON-FATTY)

| Part A: | Percent |
|---|---|
| Stearic acid | 20.0 |
| Cetyl alcohol | 0.5 |
| Menthyl anthranilate | 5.0 |
| Part B: | |
| Ammonia (26°) | 1.0 |
| Sodium hydroxide | 0.4 |
| Glycerol | 10.0 |
| Water | 62.6 |
| Perfume | Q.s. |
| Biguanide No. 10 | 0.5 |

Lipstick formulations are made up of a suitable combination of pigments and colors to give the desired mark and stain, incorporated into a base which will disperse them uniformly and will flow smoothly when molten, such as vegetable and mineral oils, fatty esters and polyalkylene glycols. Waxes are used to strengthen the stock and raise the melting point. The following are typical examples of lipstick formulations incorporating a biguanide of the invention for anti-bacterial and anti-microbial action:

| | Percent | Percent |
|---|---|---|
| Beeswax | 13 | 15 |
| Ozokerite | | 10 |
| Carnauba wax | 8 | 5 |
| Ceresin wax | | 4 |
| Lanolin | 4 | 15 |
| Lanolin absorption base | | 14 |
| Isopropyl myristate | | 10 |
| Diethyl sebacate | | 10 |
| Castor oil | 60 | 14 |
| Eosine | | 2 |
| Color | 10 | 10 |
| Antioxidant | q.s. | q.s. |
| Perfume | q.s. | q.s. |
| Biguanide No. 11 | 1 | 1 |

Dentrifices are made up in various forms including pastes, powders, liquids and solids. Tooth powders contain an abrasive, a surface active agent, flavoring oils and sweetening agents. Tooth pastes contain in addition water, a humectant, a binder and a preservative. Typical abrasives include calcium carbonate, dibasic calcium phosphate dihydrate and hydrous dibasic calcium phosphate, tricalcium phosphate, calcium sulfate, calcium pyrophosphate, insoluble sodium metaphosphate and hydrated alumina. In addition to these ingredients, a dentrifice can include a fluoride to aid in preventation of caries. The following are typical examples of dentrifice powders and pastes in accordance with the invention:

| | Percent |
|---|---|
| Insoluble sodium metaphosphate | 26.6 |
| Dicalcium phosphate | 26.6 |
| Gum | 1.4 |
| Flavor | 1.6 |
| Purified alkyl sulfate (sodium lauryl sulfate) | 1.1 |
| Glycerol and water | 41.7 |
| Biguanide No. 12 | 1 |

| | Percent |
|---|---|
| Microcrystalline aluminum hydroxide | 38.2 |
| Aluminum hydroxide (325 mesh) | 5.0 |
| Sodium fluoride | 0.1 |
| Sodium alginate | 1.0 |
| Glycerol | 15.3 |
| Sorbo (70% aqueous sorbitol) | 15.3 |
| Water | 19.8 |
| Color | 0.004 |
| Saccharin, soluble | 0.25 |
| Flavor | 1.2 |
| Sodium lauryl sulfate | 2.2 |
| Orthophosphoric acid to pH 7.3 | 0.6 |
| Biguanide No. 12 | 1 |

| | Percent |
|---|---|
| Insoluble sodium metaphosphate | 75.8 |
| Tricalcium phosphate | 20.0 |
| Alkyl sulfate (sodium lauryl sulfate) | 1.0 |
| Flavor | 2.0 |
| Saccharin | 0.2 |
| Biguanide No. 11 | 1 |

A mouthwash is usually prepared as a concentrate in the form of a solid or liquid composition which is diluted with water just before use, and incorporates water, an organic solvent such as ethyl alcohol, flavor and color. Astringent ingredients may be added for the purpose of flocculating and precipitating proteinaceous material. Buffers may be included to reduce stringy saliva, and deodorants and other therapeutic agents can also be added to relieve infection, prevent dental caries or other pathological conditions. The following is a typical example of a mouthwash:

| | Percent |
|---|---|
| Anethole | 0.500 |
| Methyl salicylate | 1.000 |
| Menthol | 0.250 |
| Saccharin sodium | 2.000 |
| Propylene glycol | 25.000 |
| Glycerol | 25.000 |
| Tween 80 | 20.000 |
| FD & C Red No. 2 | 0.075 |
| Ethyl Alcohol | 26.175 |
| Biguanide No. 9 | 1 |

Shampoos are classifiable as liquid clear shampoos, liquid cream or cream lotion shampoos, cream paste shampoos, egg shampoos, herbal shampoos, dry shampoos, liquid dry shampoos, color shampoos and aerosol shampoos. Biguanides can be incorporated in any of these types of formulations to produce an antiseptic, anti-bacterial and anti-microbial shampoo. All of these types of shampoos include a soap or detergent and an oil, fat or wax. As optional ingredients there can be included opacifying agents, clarifying agents, finishing agents, sequestering agents, conditioning agents, foam builders, preservatives, optical bleaches, builders and the like. Several typical shampoo formulations follow:

| | Percent | Percent |
|---|---|---|
| Coconut oil | 14 | |
| Olive oil | 3 | |
| Castor oil | 3 | |
| Potassium hydroxide, 85% | 4.7 | |
| Glycerol | 2 | 5 |
| Ethylalcohol | 4 | 10 |
| Sodium hexametaphosphate | 1 | |
| Perfume | 0.3 | q.s. |
| Water | 67.5 | 39.5 |
| Coconut soap potassium salt | | 35 |
| Olive oil soft soap | | 10 |
| Biguanide No. 6 | 0.5 | 0.5 |

| | Percent |
|---|---|
| Triethanolamine lauryl sulfate ($C_{10}$ to $C_{18}$) | 35 |
| Sodium alignate | 2.5 |
| Water | 62.5 |
| Biguanide No. 2 | 0.5 |
| Magnesium stearate | 1 |
| Water | 37.5 |
| Sodium lauryl sulfate ($C_{10}$ to $C_{18}$) | 30 |
| Polyvinyl alcohol, 10% | 20.5 |
| Methylcellulose 50 cps. | 9 |
| Glyceryl monolaurate | 1 |
| Lanolin | 0.5 |
| Biguanide No. 1 | 0.5 |
| Sodium keryl benzene sulfonate | 10 |
| Sodium sulfate | 6 |
| Sodium cetyl sulfate | 20 |
| Sodium carbonate | 10 |
| Sodium bicarbonate | 5 |
| White acid clay | 48.5 |
| Biguanide No. 11 | 0.5 |

The biguanides of the invention are quite useful in shaving soaps and creams and in after-shave preparations, in order to minimize infection. A lather shaving cream is usually a solution of soap in glycerol and water, in which excess solid soap may be dispersed. The following is a typical shaving cream preparation:

| | Percent |
|---|---|
| Stearic acid | 35.0 |
| Coconut oil | 10.0 |
| Potassium hydroxide | 6.1 |
| Sodium hydroxide | 2.0 |
| Glycerol | 8.0 |
| Water | 36.4 |
| Additive | 1.5 |
| Preservative | Q.s. |
| Perfume | Q.s. |
| Biguanide No. 10 | 1.0 |
| Stearic acid, triple-pressed | 10 |
| Petrolatum | 10 |
| Glyceryl monostearate | 5 |
| Triethanolamine | 1 |
| Methyl p-hydroxybenzoate | 0.2 |
| Perfume | Q.s. |
| Water | 72.8 |
| Biguanide No. 9 | 1.0 |

After-shave preparations generally contain alcohol and water, and may include agents to give a cooling effect, such as menthol, an aluminum or a zinc salt to impart astringency and styptic action, and humectants such as glycerol, propylene glycol and sorbitol to impart emolliency. The biguanide of the invention is readily incorporated in such compositions. The following is a typical after-shave lotion:

| | Percent |
|---|---|
| Ethyl alcohol, specially denatured | 50.0 |
| Sorbitol | 2.5 |
| Perfume oil | 0.5 |
| Menthol | 0.1 |
| Boric acid | 2.0 |
| Water, demineralized | 43.9 |
| Biguanide No. 7 | 1.0 |

The biguanides of the invention are particularly advantageously employed in lotions for use in the eye because of their effectiveness against fungi, bacteria and viruses. The biguanides of the invention also protect the human eye against infection.

Lotions for use in the eye must be clear, non-irritating, sterile solutions having a pH of 7.2 to 7.4, isotonic with the lachrymal fluid, and containing an effective preservative. Materials used in such lotions include preservatives, which function is served in the case of the lotions of the invention by the biguanide, boric acid, used as a non-irritating antiseptic and soothing agent, sodium chloride, sodium borate, potassium bicarbonate, potassium carbonate, sodium citrate, glycerol, methylcellulose to effect isotonicity or buffering action, zinc sulfate, used as a mild astringent, antipyrine, hydrastine hydrochloride, and berberine hydrochloride, used for local decongestant action, and aromatic waters. Typical lotions are as follows:

| | | | |
|---|---|---|---|
| Boric acid | 1.50 g | | 1.00 g. |
| Sodium borate, decahydrate | 0.25 g | | 0.17 g. |
| Sodium chloride | | | 0.25 g. |
| Phenyl ethyl alcohol | 0.5 g | | 0.50 g. |
| Antipyrine | | | 0.25 g. |
| Rose Water, to make | 5.0 cc | | 100.0 cc. |
| Distilled water, to make | 100.0 cc | | |
| Biguanide No. 7 | 0.5 percent | | 0.5 percent. |

Ointments for use in the eye can also be prepared, incorporating the biguanides of the invention and conventional ointment bases, as described heretofore.

Antiperspirants and deodorants are standard cosmetic base formulations including an active antiperspirant or deodorant ingredient. Antiperspirants are usually substances having an astringent action, including salts of aluminum, iron, chromium, lead, mercury, zinc and zirconium. The sulfates, chlorides, chlorohydroxides, phenyl sulfates, formates, lactates, sulfanates and alums are generally used. Skin irritation is minimized by the addition of small amounts of zinc oxide, magnesium oxide, aluminum hydroxide, or triethanolamine. These ingredients are formulated as liquid antiperspirants, generally applied as a spray or from an applicator container, antiperspirant creams, which are usually based on a vanishing cream-type base, and lotions, which are really a considerably diluted cream, as well as antiperspirant sticks, a lotion or cream, jellied by addition of a hard wax or soap such as sodium stearate. The following are typical antiperspirant formulations:

| Part A: | Percent |
|---|---|
| Alcohol | 50.0 |
| Propylene glycol | 5.0 |
| Hexachlorophene | 0.1 |
| Perfume | Q.s. |

| Part B: | |
|---|---|
| Aluminum chlorohydroxide | 15.0 |
| Water | 28.9 |
| Biguanide No. 7 | 1.0 |

| Part A: | |
|---|---|
| Stearic acid | 14 |
| Beeswax | 2 |
| Mineral oil | 1 |
| Span 60 | 5 |
| Tween 60 | 5 |

| Part B: | |
|---|---|
| Water | 52 |
| Aluminum chlorohydroxide | 20 |
| Perfume | Q.s. |
| Biguanide No. 7 | 1.0 |

| | |
|---|---|
| Glyceryl monostearate | 5 |
| Polyethylene glycol 1000 monostearate | 3 |
| Polyethylene glycol 400 | 5 |
| Water | 65.5 |
| E–607 Special | 5 |
| Aluminum chlorohydroxide | 15 |
| Perfume | Q.s. |
| Biguanide No. 12 | 1.5 |

Deodorants do not include an astringent agent, but instead employ a deodorant, such as zinc oxide or peroxide, boric acid, and benzilic acid. The formulation is otherwise similar to an antiperspirant.

Any of the above described cosmetic preparations can be formulated as an aerosol by incorporation of a propellant and a sufficient amount of solvent or dispersing agent to form a sprayable liquid. The propellant may itself serve as a solvent or diluent. Fluorinated hydrocarbons, chlorinated hydrocarbons, and non-halogenated hydrocarbons are the usual propellants, as is well known to those skilled in this art. Special types of pressurized containers are employed in packaging such compositions, and these also are well known and are described in the patent literature.

The above described compositions are all means for bringing the biguanides of the invention into contact with microbes to exert their antimicrobial action thereon. Many other types of compositions will be apparent to those skilled in this art.

The biguanides of this invention are useful intermediates in the preparation of other chemicals. They can, for example, be converted to dihydrotriazines of the following type, as exemplified by conversion of Compound 20:

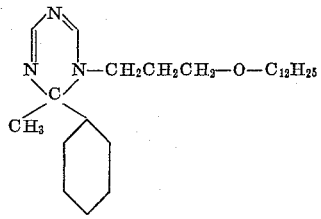

Also, these biguanides can be converted to triazines of the following structure, by reaction with esters

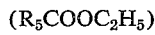

or acid chloride ($R_5COCl$):

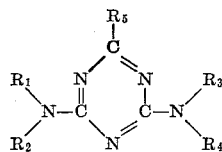

See, for example, Shapiro et al., J. Am. Chem. Soc. 79:5064 (1957); ibid: 81, 3996 (1959), J. Org. Chem. 25:379, 384 (1960); J. Am. Pharm. Ass'n (Sci. Ed.) 49:737 (1960).

We claim:
1. A monobiguanide having the formula

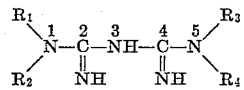

wherein at least one of $R_1$, $R_2$, $R_3$, and $R_4$ is an alkoxypropyl group having from about eleven to about nineteen carbon atoms, the remaining R groups being selected from the group consisting of hydrogen and alkyl, alkoxyalkyl, alkenyl, cycloalkyl, aryl, heterocyclic, alkaryl, aralkyl, haloaralkyl and haloaryl radicals having from one to about eighteen carbon atoms, the said haloaralkyl and haloaryl radicals having from one to three halogen atoms.

2. A monobiguanide in accordance with claim 1 in which one of $R_1$ and $R_2$ and one of $R_3$ and $R_4$ are alkoxypropyl.

3. A monobiguanide in accordance with claim 1 in which one of $R_1$ and $R_2$ is alkoxypropyl, one of $R_3$ and $R_4$ is an aralkyl group and the remaining R's are hydrogen.

4. A monobiguanide in accordance with claim 3 in which the aralkyl group is a benzyl group.

5. A monobiguanide in accordance with claim 1 in which one of $R_1$ and $R_2$ is alkoxypropyl, one of $R_3$ and $R_4$ is an alkyl group and the remaining R's are hydrogen.

6. A monobiguanide in accordance with claim 5 in which the alkyl group is a methyl group.

7. A monobiguanide in accordance with claim 1 in which one of $R_1$ and $R_2$ is alkoxypropyl, one of $R_3$ and $R_4$ is a haloaralkyl group and the remaining R's are hydrogen.

8. A monobiguanide in accordance with claim 7 in which the haloaralkyl group is a chlorobenzyl group.

9. A monobiguanide in accordance with claim 7 in which the haloaralkyl group is a dichlorobenzyl group.

10. An acid addition salt of a compound in accordance with claim 1.

11. $N^1$-(lauroxypropyl) biguanide.

12. $N^1$-(lauroxypropyl), $N^5$-(methyl), $N^5$(benzyl)-biguanide.

13. $N^1$-(lauroxypropyl)-$N^5$-(dimethyl)-biguanide.

14. $N^1$-(lauroxypropyl)-$N^5$-(dibenzyl)-biguanide.

15. $N^1$ - (lauroxypropyl)-$N^5$-(4-chlorobenzyl)-biguanide.

16. $N^1$ - (lauroxypropyl) - $N^5$-(methyl), $N^5$-(4-chlorobenzyl)-biguanide.

17. $N^1$ - (lauroxypropyl) - $N^5$-(2,4-dichlorobenzyl)-biguanide.

References Cited in the file of this patent
UNITED STATES PATENTS

| | | |
|---|---|---|
| 2,213,474 | Puetzer | Sept. 3, 1940 |
| 2,289,541 | Ericks et al. | July 14, 1942 |
| 2,350,453 | Ericks | June 6, 1944 |
| 2,375,659 | Jones et al. | May 8, 1949 |
| 2,467,371 | Curd et al. | Apr. 19, 1949 |
| 2,479,850 | Marks | Aug. 23, 1949 |
| 2,631,146 | Weidenheimer et al. | Mar. 10, 1953 |
| 2,695,881 | Elliott et al. | Nov. 30, 1954 |
| 2,698,301 | Smith | Dec. 28, 1954 |
| 2,734,807 | Chenicek et al. | Feb. 14, 1956 |
| 2,791,534 | Schaaf et al. | May 7, 1957 |
| 2,812,284 | Sanders | Nov. 7, 1957 |
| 2,893,918 | Abramson | July 7, 1959 |
| 2,908,713 | Mamalis et al. | Oct. 13, 1959 |
| 2,913,368 | Birum | Nov. 17, 1959 |
| 2,955,985 | Kuna | Oct. 11, 1960 |

FOREIGN PATENTS

| | | |
|---|---|---|
| 557,985 | Belgium | Nov. 30, 1957 |

OTHER REFERENCES

Weinberg: Antibiotics and Chemotherapy, volume 11, pages 572–582 (1961).

UNITED STATES PATENT OFFICE
CERTIFICATE OF CORRECTION

Patent No. 3,152,181                      October 6, 1964

Seymour L. Shapiro et al.

It is hereby certified that error appears in the above numbered patnt requiring correction and that the said Letters Patent should read as orrected below.

Column 1, line 61, for "Streptoccus" read -- Streptococcus --; column 3, line 25, after "cyclopentyl" insert a comma; line 31, for "valvence" read -- valence --; column 4, compound No. (10) should appear as shown below instead as in the patent:

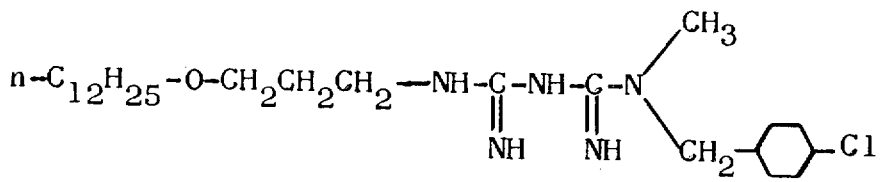

column 7, lines 18 to 28, the formula should appear as shown below instead of as in the patent:

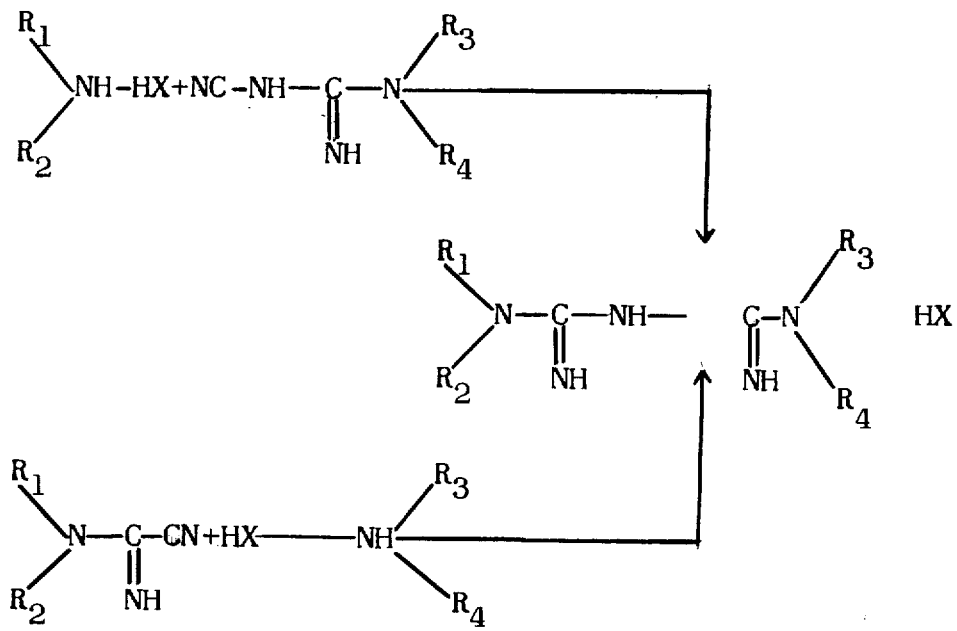

3,152,181 same column 7, line 32, for "w-alkoxypropylamines" read -- ω-alkoxypropionitrile --; line 33, for "w-alkoxypropulamines" read -- ω-alkoxypropylamines --; column 11, line 62, for "meomycin" read -- neomycin --; column 12, line 6, for "form" read -- from --; line 44, for "which" read -- with --; column 13, line 38, for "monosterate" read -- monostearate --; column 14, first table, under the heading "Beeswax-Borax, Percent", and opposite "Mineral Oil", for "-----" read -- 49.0 --; column 15, last table, last column thereof, and opposite "Lanolin", for "15" read -- 5 --; column 16, first table, first column, line 6 thereof, after "Rose Water" strike out ", to make"; same table, third column, line 6 thereof, before "1000.0 cc." insert -- to make --; column 19, line 37, for "chloride" read -- chlorides --; column 20, line 43, for "May 8, 1949" read -- May 8, 1945 --.

Signed and sealed this 6th day of April 1965.

(SEAL)
Attest:

ERNEST W. SWIDER
Attesting Officer

EDWARD J. BRENNER
Commissioner of Patents